(12) United States Patent
Benito-Navazo

(10) Patent No.: US 6,835,038 B2
(45) Date of Patent: Dec. 28, 2004

(54) WALL PLUG

(75) Inventor: Juan Manuel Benito-Navazo, Sant Cugat Del Vallès (ES)

(73) Assignee: Aparellaje Electrico, S.L., Barcelona (ES)

(*) Notice: Subject to any disclaimer, the term of this patent is extended or adjusted under 35 U.S.C. 154(b) by 144 days.

(21) Appl. No.: 10/190,562

(22) Filed: Jul. 9, 2002

(65) Prior Publication Data

US 2003/0012618 A1 Jan. 16, 2003

(51) Int. Cl.$^7$ .................................................. F16B 1/00
(52) U.S. Cl. .................... 411/80.1; 411/372.5; 411/373
(58) Field of Search ................................ 411/34, 35, 36, 411/37, 38, 60.2, 73, 80.1, 372.5, 372.6, 373, 377, 930

(56) References Cited

U.S. PATENT DOCUMENTS 4,214,505 A * 7/1980 Aimar ........................ 411/373
5,676,511 A * 10/1997 Meylan ..................... 411/372.6

FOREIGN PATENT DOCUMENTS

CH         651112 A  *  8/1985  .......... F16B/13/02

* cited by examiner

Primary Examiner—Heather Shackelford
Assistant Examiner—Lisa Saldano
(74) Attorney, Agent, or Firm—Staas & Halsey LLP

(57) ABSTRACT

A wall plug suitable for fixing a threaded fastener member to a compact architectural member. The plug is a tubular body portion formed by: a fore portion provided internally with an orifice for insertion of the threaded fastener member and externally with anti-rotation ribs; a long central expansion portion, having longitudinal through slots; and a short rear tail portion for final screwing; and a cup for receiving the head portion of the threaded fastener member having a bottom wall in which said orifice opens for insertion of the threaded fastener member and the diameter of which is greater than the diameter of any part of the tubular body portion.

6 Claims, 3 Drawing Sheets

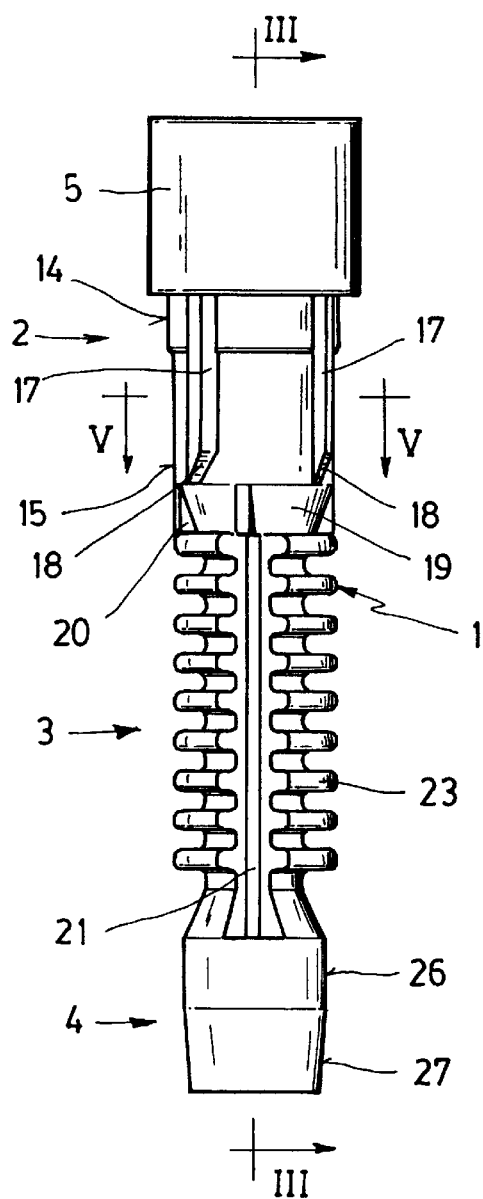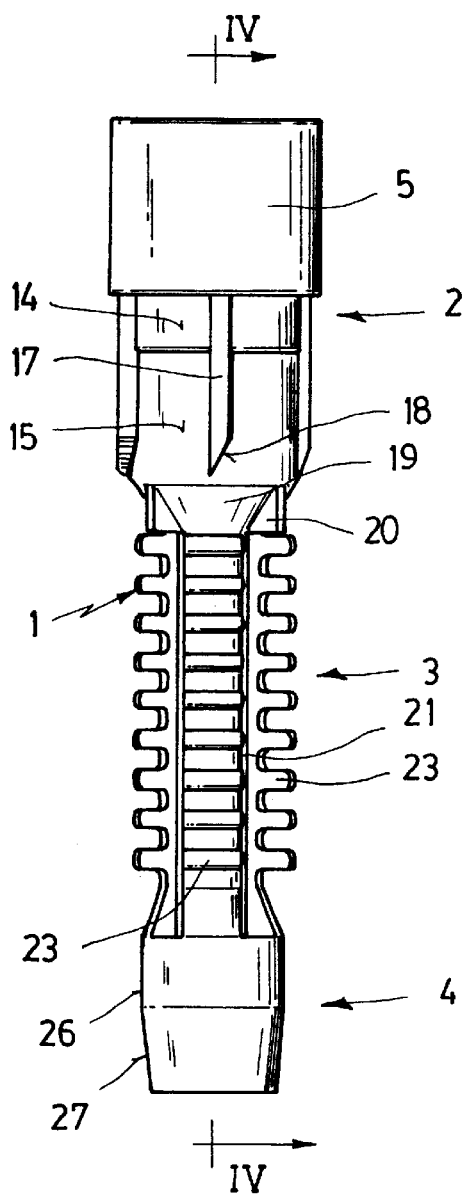
FIG. 1
FIG. 2

FIG. 3
FIG. 4
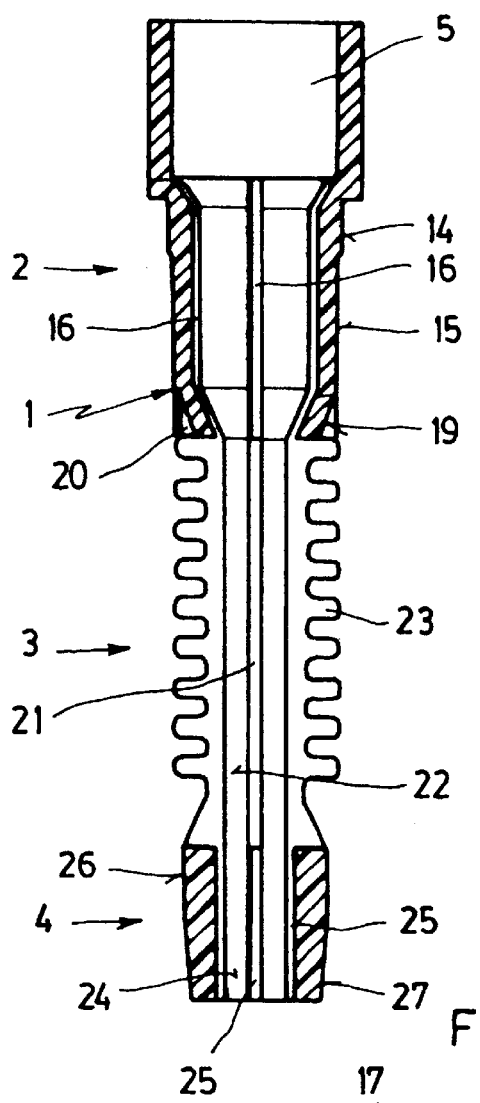
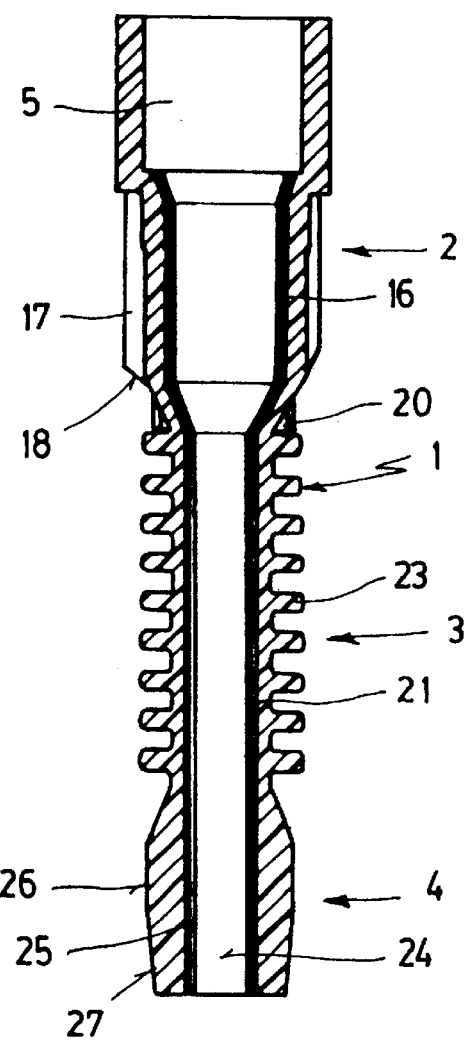
FIG. 5
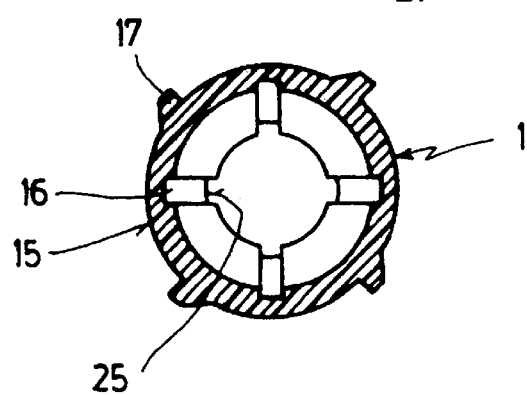

WALL PLUG

DESCRIPTION

BACKGROUND OF THE INVENTION

1. Field of the Invention

This invention relates to a wall plug, suitable for fixing a threaded fastener member to a compact architectural member, said threaded fastener member being provided with a head portion defining a seating surface, and said plug being formed by a tubular body portion defining at least one first transverse dimension and comprising: [i] a fore portion provided internally with an orifice for insertion and initial screwing of said threaded fastener member and provided externally with anti-rotation means; [ii] a long central expansion portion, having longitudinal through slots; and [iii] a short rear tail portion for final screwing.

The said compact architectural member may be a wall, either of solid brick, concrete, hollow brick, etc., or a ceiling, or any surface. In turn, the invention relates preferably to a plug made from synthetic plastics material.

2. Prior Art

If these conventional plugs are used for the attachment of a raceway for electrical wiring to a wall, metal structure or other supports, there is the risk that one or more of the cables housed in the raceway may become deteriorated by friction with the head portions of the threaded fastener members and with the washers accompanying them, which may cause short circuits or faults in the electrical circuits.

SUMMARY OF THE INVENTION

With a view to avoiding this risk of presumable accident in raceway installations, the solution has been adopted of doing away with the metal washer, relegating its function to the plug, and of making the head portion of the threaded fastener member or screw inaccessible to the cables installed in the raceway.

In accordance with the foregoing solution, the wall plug of the invention has been developed, said plug including a cup for housing completely and loosely said head portion of said threaded fastener member, said cup: being provided with a bottom wall in which said orifice opens for insertion of said threaded fastener member; and having a second transverse dimension larger than said first transverse dimension of said tubular body portion.

According to a preferred feature of the invention, said bottom wall of said cup is provided with a shape mating with said seating surface of said head portion of said threaded fastener member.

Also according to the invention, said cup is provided with removable stopping means.

The invention also contemplates that said cup is an independent body member and separable from said tubular body portion, in which case there are means for coupling said cup to said tubular body portion.

BRIEF DESCRIPTION OF THE DRAWINGS

To facilitate an understanding of the foregoing ideas, there is described hereinafter the objects of the invention, with reference to the accompanying illustrative drawings, in which:

FIG. 1 is an elevation view of a plug having the features of the invention.

FIG. 2 shows the plug of FIG. 1 rotated in an angle about its axis.

FIG. 3 is a cross section view along the line III—III of FIG. 1.

FIG. 4 is a cross section view along the line IV—IV of FIG. 2.

FIG. 5 is a cross section view along the line V—V of FIG. 1, on a larger scale.

DETAILED DESCRIPTION OF THE PREFERRED EMBODIMENTS

As already mentioned above, it has been considered that a conventional wall plug is divided into a fore portion, a central expansion portion and a rear tail portion. When the plug is used, the first of the three portions remains visible, while the remaining portions are hidden as being sunk into the compact architectural member, be it a wall, a vertical surface, a support or other member.

FIGS. 1 through 4 show a preferred embodiment of the wall plug 1 of the invention, seen in elevation view in two positions and the corresponding diametral sections.

In the Figures there is to be distinguished the fore portion 2, the central expansion portion 3 and the rear tail portion 4.

Figure 6:
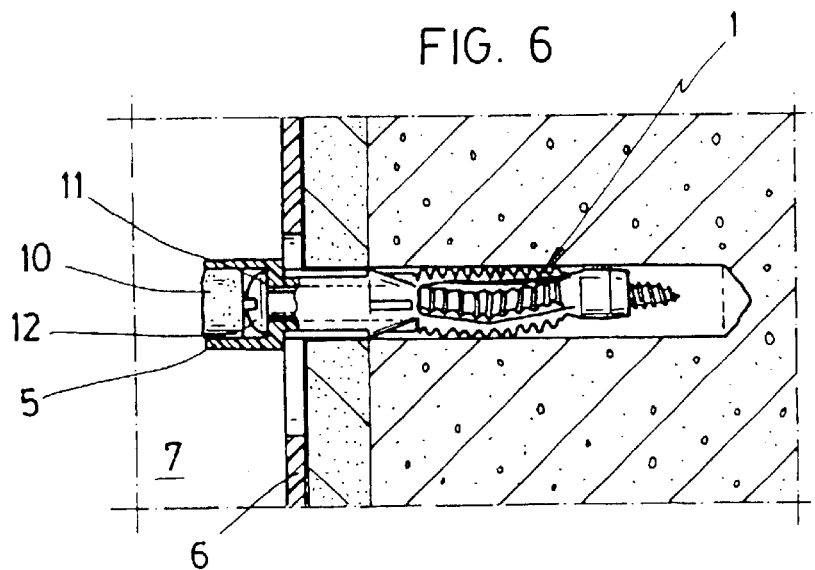
FIG. 6 is a view, partly in section, of the installation of a plug according to the invention in a solid wall for the attachment of an electrical raceway.
Figure 7:
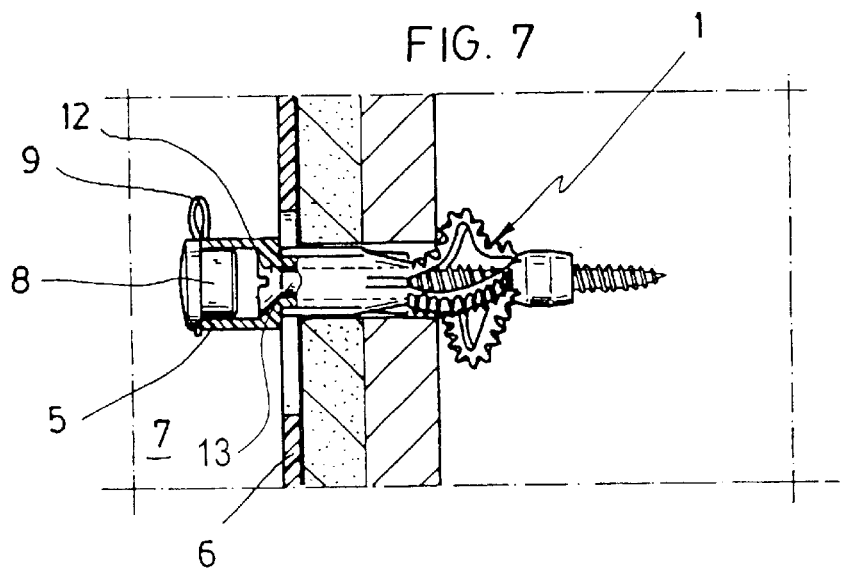
FIG. 7 is a view, partly in section, of the installation of a plug according to the invention in a hollow brick or thin wall for the attachment of an electrical raceway.
Figure 8:
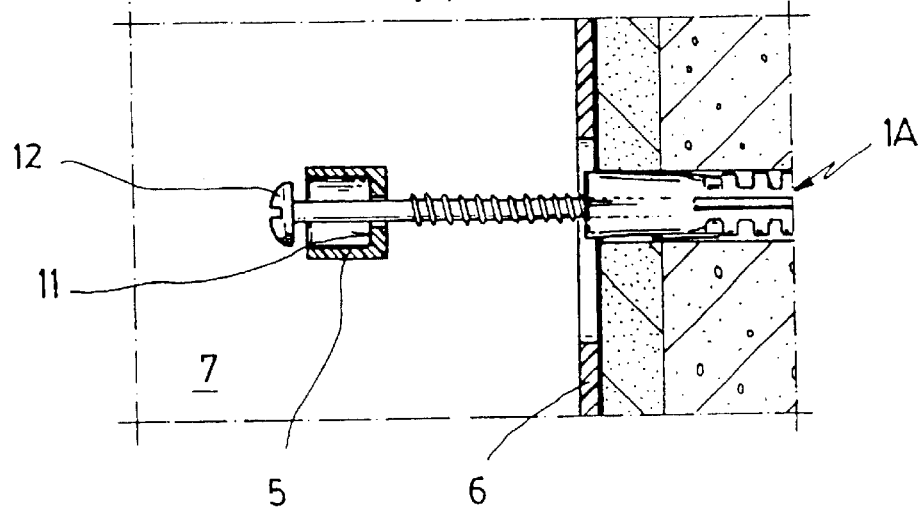
FIG. 8 is a view, partly in section, of a cup and a screw tipped into a conventional plug sunk into a wall.

According to the invention, the fore portion 2 is complemented with a cup 5 which may be integral with said fore portion of the head portion 2 and, therefore, with the plug 1, as shown in said FIGS. 1 through 4 and in FIGS. 6 and 7, or it may form an independent separable part, as shown in FIG. 8, in which case the cup 5 may be foreign to the plug 1A, and may be applied to any conventional plug, in the fashion of a three dimensional washer. The dimensions of the cup 5 are sufficient to be able to house completely and loosely the head of the threaded fastener member or screw 13 and particularly the depth of the cup is substantially greater than the height of the head portion 12 of the screw 13, as shown in FIGS. 6, 7 and 8.

The transverse dimension (the second transverse dimension) or, as the case may be, the diameter of the cup 5 is greater than the larger dimension (first transverse dimension) or also, as the case may be, the diameter of the tubular body portion 1. Thus, the cup 5 forms with the tubular body portion 1, a seating step (like a washer) on the member to be attached, such as may be the base wall 6 of an electrical raceway 7, as shown in FIGS. 6 to 8.

The cup 5 may be closed with a removable stopper in the form of, e.g., a cap or plug 8 hinged to or possibly associated with the cup 5 via a connection member 9 (FIG. 7), or a removable type seal; 10 (wax, plasticine, soft plastic plug, etc.) as shown in FIG. 6.

FIGS. 1 to 7 show the case where the cup 5 is an integral portion of the plug 1, in which case the different parts thereof have the features to be described hereinafter.

The fore portion 2 of the wall plug includes the cup 5, which is preferably formed by an internally and externally smooth cylindrical wall, which is appropriate for housing the head 12 of the screw 13 and is provided with a bottom wall 11 shaped in a way to mate with the seating surface of the head 12 of the screw 13 to be used in the plug 1. Thus, in FIGS. 6 and 8, said bottom wall 11 is flat for a round-headed screw 13, while in FIG. 7, the bottom wall 11 is countersunk for a conical head screw.

The cup 5 is extended in a first short cylindrical body portion 14 having a smaller diameter followed by a second cylindrical body portion 15 of even smaller diameter, which is internally provided with longitudinal blind slots 16 (i.e. which are closed relative to the outer surface of the cylindrical body portion 15) and regularly spaced apart. This second cylindrical body portion 15 is provided externally with axial anti-rotation ribs 17 which are offset relative to the longitudinal slots 16 and are beveled 18 at the end thereof. The second cylindrical body portion 15 is extended in turn in a small frustoconical region in the inside of which there extend the above-mentioned longitudinal slots 16 and it is provided on the outside thereof with gussets 20 the outside end surfaces of which are arranged as an extension of the outer surface of the second cylindrical body member 15.

The central expansion portion 3, which is likewise a tubular cylinder, is provided with longitudinal through slots 21 as extensions of the longitudinal blind slots 16 of the fore portion 2, the inner surface 22 thereof being smooth and the outer surface corrugated, forming projections 23, preferably orientated parallel and equidistant.

The rear tail portion 4 is internally cylindrical 24 and is provided with longitudinal blind slots 25 as extensions of the longitudinal blind slots 16 of the fore portion 2 and the longitudinal through slots 21 of the central expansion portion 3, while it is provided on the outside thereof with a cylindrical portion 26 followed by a frustoconical portion 27.

What I claim is:

1. A plug, suitable for fixing a threaded fastener member to a wall, the threaded fastener member being provided with a head portion defining a seating surface and an opposite leading portion, and the plug comprising:

a tubular body portion having a first end and a second end, a length dimension and at least one width dimension, a fore portion at the first end provided externally with anti-rotation members to engage the wall, a tail portion at the second end and having a first length, a central expansion portion located between the fore portion and the tail portion, having a second length greater than the first length of the tail and having longitudinal through slots therealong, wherein said longitudinal through slots terminate between the central expansion portion and the tail portion, wherein a continuous orifice is formed through the tubular body portion, and wherein the opposite leading portion of the threaded fastener member is received through the orifice at the fore portion, through the central portion and is threadingly received by the tail portion; and a cup located on the fore portion for completely receiving the head portion of the threaded fastener member, having an orifice, being provided with a bottom wall into which the orifice of the tubular body portion opens for receiving the seating surface of the threaded fastener member, and having a width dimension greater than the width dimension of the tubular body portion.

2. The plug as recited in claim 1, wherein the bottom wall of the cup has a shape complementing the seating surface of the head portion of the threaded fastener member.

3. The plug as recited in claim 1, wherein the orifice of the cup receives a removable stopper.

4. The plug as recited in claim 1, wherein the cup is a separate member from the tubular body portion.

5. The plug as recited in claim 1, wherein the cup is formed as one piece with the tubular body portion.

6. The plug as recited in claim 1, wherein the orifice of the cup includes a removably connected cap to close the orifice of the cup.

* * * * *